United States Patent [19]

Knauer

[11] Patent Number: 4,751,675

[45] Date of Patent: Jun. 14, 1988

[54] MEMORY ACCESS CIRCUIT WITH POINTER SHIFTING NETWORK

[75] Inventor: Scott C. Knauer, Mountainside, N.J.

[73] Assignee: American Telephone and Telegraph Company, AT&T Bell Laboratories, Murray Hill, N.J.

[21] Appl. No.: 766,450

[22] Filed: Aug. 19, 1985

[51] Int. Cl.[4] .................. G11C 7/00; G11C 13/00
[52] U.S. Cl. .................................. 365/78; 365/189; 365/221
[58] Field of Search ............... 365/221, 239, 77, 240, 365/78, 189

[56] References Cited

U.S. PATENT DOCUMENTS

| | | | |
|---|---|---|---|
| 4,222,102 | 9/1980 | Jansen et al. | 365/221 X |
| 4,507,760 | 3/1985 | Fraser | 365/221 |
| 4,592,019 | 5/1986 | Huang et al. | 365/78 |

Primary Examiner—Stuart N. Hecker
Assistant Examiner—Alyssa H. Bowler
Attorney, Agent, or Firm—Henry T. Brendzel

[57] ABSTRACT

A relatively addressed memory is disclosed for accessing a data list located in a distributed architecture first-in first-out (FIFO) or last-in first-out (LIFO) memory. The memory permits any data in the data list to be addressed and accessed relative to the head or tail of the data list. This access allows reading and writing of data at the relative location. The addition of a data shifting capability enables the insertion and deletion of data at the relative location. When the memory consists of several memory chips, a memory routing network and a transfer circuit enables relative addressing across memory chips.

8 Claims, 6 Drawing Sheets

MEMORY ACCESS CIRCUIT WITH POINTER SHIFTING NETWORK

TECHNICAL FIELD

This invention relates to data memory modules and, more particularly, to improved memory modules that operate both as first-in first-out (FIFO) or last-in first-out (LIFO) memories, and as relative address memories.

BACKGROUND OF THE INVENTION

First-in first-out memories resemble a queue, with a "head" which contains the oldest information and a "tail" which contains the most recent information. Last-in first-out memories, on the other hand, resemble a stack of cards where the "head" or "top of the stack" contains the most recent information and the "tail" or "bottom of the stack" contains the oldest information. In FIFO memories it is the oldest information that exits the queue first. In LIFO memories it is the most recent information that exits the stack first.

The most common design of FIFO/LIFO memories employs random access memories (RAMs) to store information, and counters to keep track of the RAM address of the "head" and "tail" of the stored information. This design, however, suffers several drawbacks. First, the delay from initiation of the read or write cycle to the data output or write operation includes both counter and memory decoder delays. Second, in LIFO operation, the RAM must first be read and written in one LIFO clock period and that presents problems in the RAM utilization; and third, asynchronous clocking of the head and tail can generate a requirement for simultaneous reading and writing of the RAM, which can force delay of the operations. A dual ported memory can solve the second and third drawbacks, but only at the expense of adding to the complexity of the memory system.

Another FIFO design technique uses a constant length shift register as a FIFO memory, writing the data in at one end, then shifting it out at the other. This avoids the need for a decoder, but introduces counter delays and a constant latency, or fall-through time. A LIFO may also be implemented with shift registers by using a bi-directional shift register. The register is shifted one way when data is inserted, and the other way when data is read out. However, the FIFO/LIFO designs which use shift registers require miore power than those which use RAM circuitry.

U.S. Pat. No. 4,592,019, issued May 27, 1986 to Alan Huang et al, discloses a system that overcomes the above problems by using a modular FIFO/LIFO design which has distributed control. Each memory cell independently determines its own occupancy status and position in a data list by using the occupancy status information from itself and from adjacent memory cells. With this information, a memory cell can determine whether it is at the head of a list, in the middle of a list, or at the tail of the list. Armed with this knowledge, each memory cell can determine whether it should respond or not respond to a read or write command.

In certain applications there is an increasing need for FIFO/LIFO memories having a more complete and an asynchronous access not only to data at the head or tail of a data list, as in Huang et al, but also to any of the data items stored in the list. It is an object of this invention to satisfy this need.

SUMMARY OF THE INVENTION

According to the present invention, a memory access circuit is arranged to operate with the Huang et al FIFO/LIFO memory circuit to enable access to any data located in the memory. Memory data is selected for access by using its address relative to the "head" or "tail" location of the data list to control selection by the memory access circuit. The Huang et al memory circuit provides information to the memory access circuit defining the location of the head or tail of the data list, and a mode control circuit defines the various operating functions (read, write, delete, and insert) to be performed under control of the memory access circuit.

In one embodiment the FIFO/LIFO memory and the memory access circuit are modularized to enable the construction of large memories without significantly increasing circuit complexity or access times. This embodiment includes modules having $2^n$ memory cells and a memory access circuit for selecting any cell therein using the lower n bits of the relative address. Since the addressing is relative, the Huang et al control element is used by each cell to detect whether that cell is the head or tail of the data list. The memory access network selects the memory cell specified using the relative address and the head cell information (if addressing mode is relative to the head). The upper bits of the relative address control a higher level memory access circuit that selects which memory module is to be accessed.

BRIEF DESCRIPTION OF THE DRAWING

The operation of the present invention will be more fully appreciated from the detailed description which references the drawings, in which.

DETAILED DESCRIPTION

Figure 1:
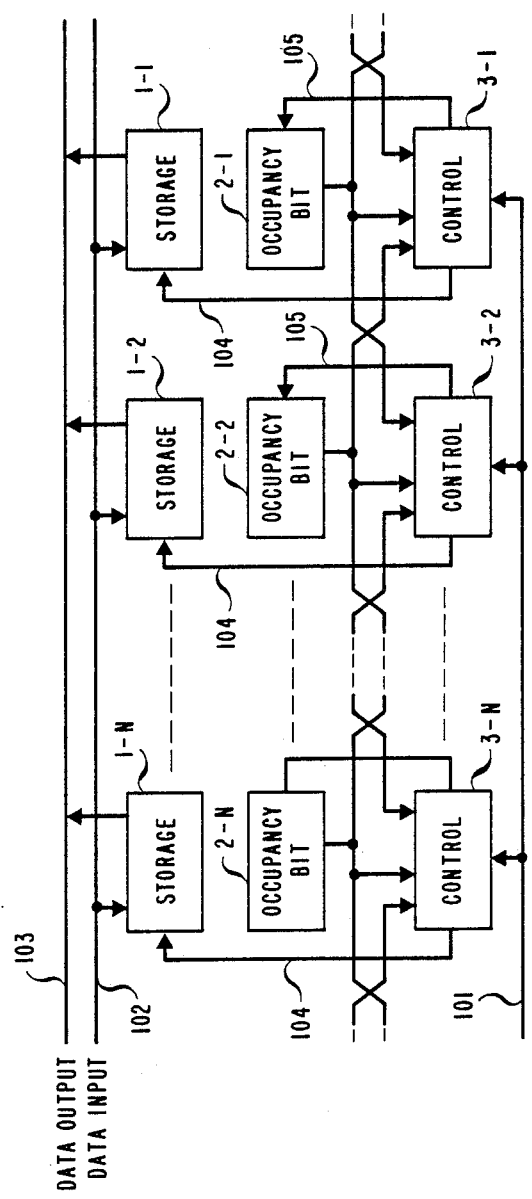
FIG. 1 depicts the structure of the Huang et al type memory circuit.

FIG. 1 shows the Huang et al memory circuit with its basic elements arranged to clearly describe the circuit's operation. In FIG. 1, storage elements 1-1, 1-2, and 1-N are connected to data input bus 102 and to data output bus 103. Each storage element is capable of either storing the information presented on bus 102, or presenting its stored information to bus 103, and has an associated occupancy bit 2-$i$ and a control element 3-$i$. The storage element, its associated occupany bit, and its associated control element form a cell of the memory circuit of FIG. 1. An occupany bit is at logic level 1 when the storage element of its cell, 1-$i$, contains valid data (is full), and logic 0 otherwise. Each control element receives information from its associated occupancy bit, from the occupancy bit to its left and from the occupancy bit to its right. In addition, it receives mode information from bus 101 which informs the circuit of FIG. 1 whether to behave as a FIFO or a LIFO memory and whether to read or write information. Based on the input signals to each control element, a decision is made within the control element as to whether or write into or read from the associated storage element and whether to set or reset its associated occupancy bit. This decision is effected through lines 104 (going to the storage elements) and 105 (going to the occupancy bits).

The decisions within each control section are made in accordance with the logic expressed in the following example, where it is assumed that the most recent information is placed at the left end of the list. When control circuit 3-2 receives an occupancy bit pattern of "011" (from elements 2-3, 2-2, and 2-1, respectively), it determines that storage element 1-2 contains the most recent information. A pattern of "110" indicates that cell 2 contains the oldest information, and a pattern of "001" indicates that cell 2 is a vacant neighbor to the left of the most recent information. An occupancy bit pattern of "101" indicates that cell 2 is the only empty cell in the memory circuit and that, therefore, the memory is close to an imminent overflow. A pattern of "010", on the other hand, indicates that cell 2 is the only occupied cell in the memory circuit and that, therefore, the memory is close to an imminent underflow. Should the FIFO/LIFO circuit of FIG. 1 be found empty (assuming, for example that cell N is connected to cell 1), a detector that basically executes the OR function of all the occupancy bits can be made to force one of the occupancy bits to appear at logic level 1, thereby "seeding" the circuit.

Figure 2:
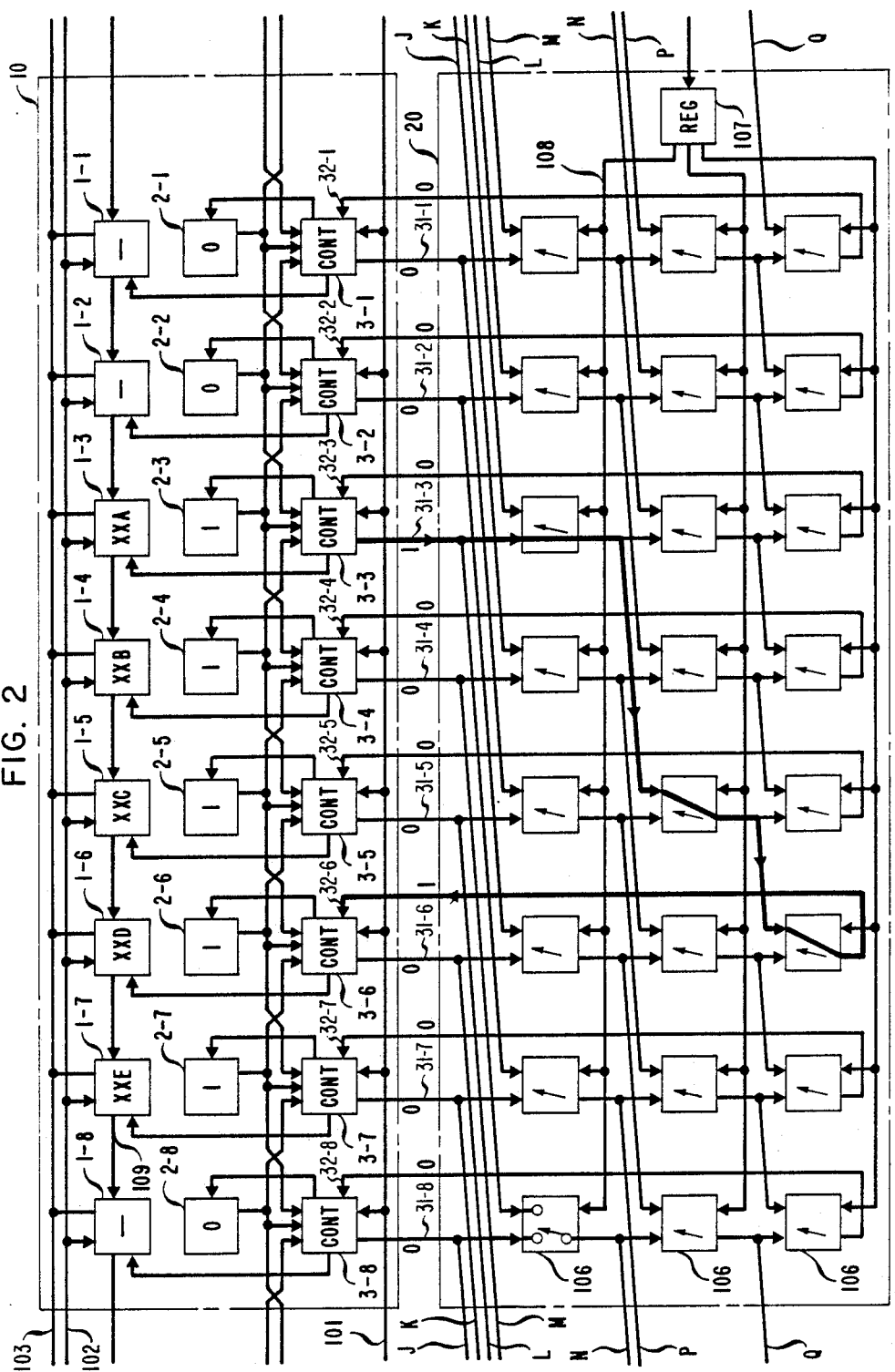
FIG. 2 illustrates a memory circuit module including the present memory access circuit.

FIG. 2 depicts an improved memory circuit in accordance with the principles of my invention. It comprises a memory network 10, which is an eight cell Huang et al FIFO/LIFO memory module (note storage sections 1-1 through 1-8), and an access network 20, which is a memory access circuit. The fact that eight cells are depicted in the FIG. 2 circuit should, of course, not be taken as a requirement or a limitation of the circuit.

In accordance with the FIG. 1 circuit, each cell in network 10 includes a storage element, an occupancy bit and a control element, such as elements 1-1, 2-1, and 3-1, respectively. It should perhaps be noted that the control element of the left-most cell of FIG. 2 (element 3-8) receives occupancy information concerning the left adjacent cell from outside the circuit of FIG. 2. That information may be supplied from an initialization circuit, from a cell of a memory module connected to the left of the module shown in FIG. 2, or from the right-most occupancy bit of the FIG. 2 circuit. Likewise in connection with the control element of the right-most cell of FIG. 2 (element 3-1). It may also be noted that, unlike the control elements of FIG. 1, each control element of FIG. 2 has a line 31 that provides a signal to memory access network 20 and a line 32 that accepts a signal from memory access network 20.

According to the present invention, memory access network 20 provides relative addressing to the Huang et al memory circuit design in such a way as to retain its advantages and provide modular connectivity for each module. More particularly, memory access network 20 extracts the "head" or "tail" determination of each control element in network 10 (derived from the three occupancy bits) via lines 31, shifts that pointer information by an amount specified by a relative address (R) and returns the shifted information to the control elements in network 10 via lines 32.

To achieve this function, memory access network 20 comprises a register 107 for storing the relative address and a modified PM2I (plus minus $2^i$) shift network that shifts its input bits to the left by a number of positions equal to the relative address stored in register 107. The input of the PM2I network is obtained from lines 31 and the output of the PM2I network is applied to lines 32. As a result, the "head" or "tail" pointer specified by lines 31 is shifted to the left by the relative address stored in register 107 and, as shifted, presented back to network 10.

The PM2I network comprises rows of switches 106 which effectively are single pole double throw switches. Whether switches 106 are arranged with the "center pole" being at the input or at the output is unimportant, as long as the switches are arranged to either pass a signal shifted or unshifted. In FIG. 2, switches 106 are depicted as double input-single output switches. Based on a control signal that is common to all switches 106 in a particular row, e.g., line 108, switches 106 in FIG. 2 either accept the input signals of their left input (executing no shift) or the input signals of their right input (executing a shift to the left).

In general, the first row of switches 106 receives its input from lines 31 and, when directed to, shifts the information to the left by $2^n$ positions (where $2^{(n+1)}$ is the number of cells in network 10). The second row of switches receives its input from the first row and, when directed to, shifts the information to the left by $2^{(n-1)}$ positions. The last row receives its input from the penultimate row and, when directed to, shifts the information to the left by one position and applies its output to lines 32. Since the size of memory access network 20 is compatible with the number of memory cells in network 10, in the circuit of FIG. 2 the number of rows of switches 106 in the PM2I shift network is 3 (permitting a shift of 4, plus 2, plus 1 for a maximum shift of 7). Network 20 also accommodates shifts to the right. Such shifts may be viewed as negative shifts or as shifts modulo N, where N is the number of cells in network 10. To permit such shifts (also, thereby allowing one memory access network 20 to be concatenated to another memory access network 20 and thus accommodating concatenated memory networks, the construction of memory access network 20 includes leads J, K, L, M, N, P and Q on the left side of network 20 that may be connected to identically labeled leads on the right side of network 20 (or the next memory access network).

To better understand the operation of the present invention, by way of example the memory cells of FIG. 2 are shown to contain a data list xxa through xxe. Data item xxa is (considered to be at the head of the list) is in cell 3, data items xxb, xxc and xxe are in succeeding cells, and data item xxe is considered to be at the tail of the list is in cell 7. The data items can be of any number of bits and, therefore, storage elements 1-$i$ in network 10 can be multi-bit registers. Storage elements 1-1, 1-2 and 1-8 are empty and are denoted by the dash symbol. In accord with the above, occupancy bits 2-3 through 2-7 are at logic 1 and occupancy bits 2-1, 2-2 and 2-8 are at logic 0. Control element 3-3 recognizes the "head" of the data list from the "110" pattern of the occupancy bits and places a logic 1 on its output line 31. This assumes, of course, that the "head" of the list is the desired reference pointer location. In the example of FIG. 2, the relative displacement address signal in register 107 is 011 and hence the first row of switches 106, in response to the logic 0 of the most significant bit, does not perform a shift to the left (of eight positions), but the second and the third rows of switches 106 do perform a shift to the left of 2 and 1 positions, respectively, (in response to the logic 1 of the middle and the least significant bits). The result, shown by the heavy line in FIG. 2, is that the logic 1 at line 31 of control element 3-3 (the reference pointer) is shifted three positions to the left in accordance with the 011 relative address in register 107, and is applied to control element 3-6 via its input line 32 as the relative pointer.

In addition to the occupancy bit information and the line 32 information that is applied onto each control element, miode control information is provided via bus 101. The mode control information is used in the present invention to determine: (1) whether the memory circuit is to function as a FIFO or a LIFO memory, (2) whether the relative addressing should be enabled, (3) whether the head is to be located at the left or right of the list, (4) whether reading or writing is to occur at the location of the relative pointer, and (5) whether the shift option should be employed for insertion and deletion. Taken in combination, many different novel and useful modes of operation are possible; but the primary capabilities offered by my present invention over and above the conventional FIFO/LIFO operation are to read in the middle of a list, to over-write in the middle of a list, to insert new information in the middle of a list, or to delete information from the middle of a list.

To accomplish the latter two capabilities, memory network 10 must be able to shift information from one cell to its neighbor in order to create an empty cell or to eliminate an empty cell in the list. This capability is provided in network 10 of FIG. 2 by lines 109 that interconnect the storage elements. Although lines 109 indicate a "shift to the left" capability, it may be noted that a "shift to the right" or a bilateral shift capability would be equally useful.

Memory access network 20 implemented with a PM2I network has a number of implementation advantages, such as high speed and ease of IC realization (because of its regular structure) but it should be realized that other embodiments encompassed by the principles of my invention are also possible. A banyan network, for example, is also capable of performing externally routed circular shifts. In another alternative embodiment, for example, the signals presented by network 10 on lines 31 are encoded within network 20 into a binary number and the relative address is added to that number. The result is decoded and applied to network 10 via lines 32. In this alternate embodiment, signals J through Q are handled as "carry-in" and "carry-out" signals which are appropriately included in the addition. For example, a reference pointer location on input at cell 3 is converted to the number 3 to which the relative displacement address of, say, 6 is added. The result, 9, is decoded to provide a relative pointer location to cell 9. When only a single 8 cell module is used, the addition is performed in modulo 8 thereby setting the pointer location on lines 31 at cell 1. In the more general, multimodule application where A is the input from network 10 and R is the relative address, the addition equation for the module in which the pointer is found takes the following form:

$A + R \leq N$ then Output $= A + R$; Carry-out $= 0$
$A + R > N$ then Output $= 0$; Carry-out $= A + R - N$.
For all other models,
if Carry-in $\leq N$ Output $=$ Carry-in; Carry-out $= 0$
if Carry-in $> N$ No Output; Carry-out $=$ Carry-in $- N$.

As suggested above, a number of networks 10 interacting with networks 20 may be interconnected to form moderate sized memories that follow the principles of my invention. When so organized, each network 10 or network 20 may be thought of as a basic building block or module and, in fact, these modules may advantageously be implemented with integrated circuits.

A more hierarchical organization of memory access networks 20 is required to minimize delay in larger memories.

Figure 3:
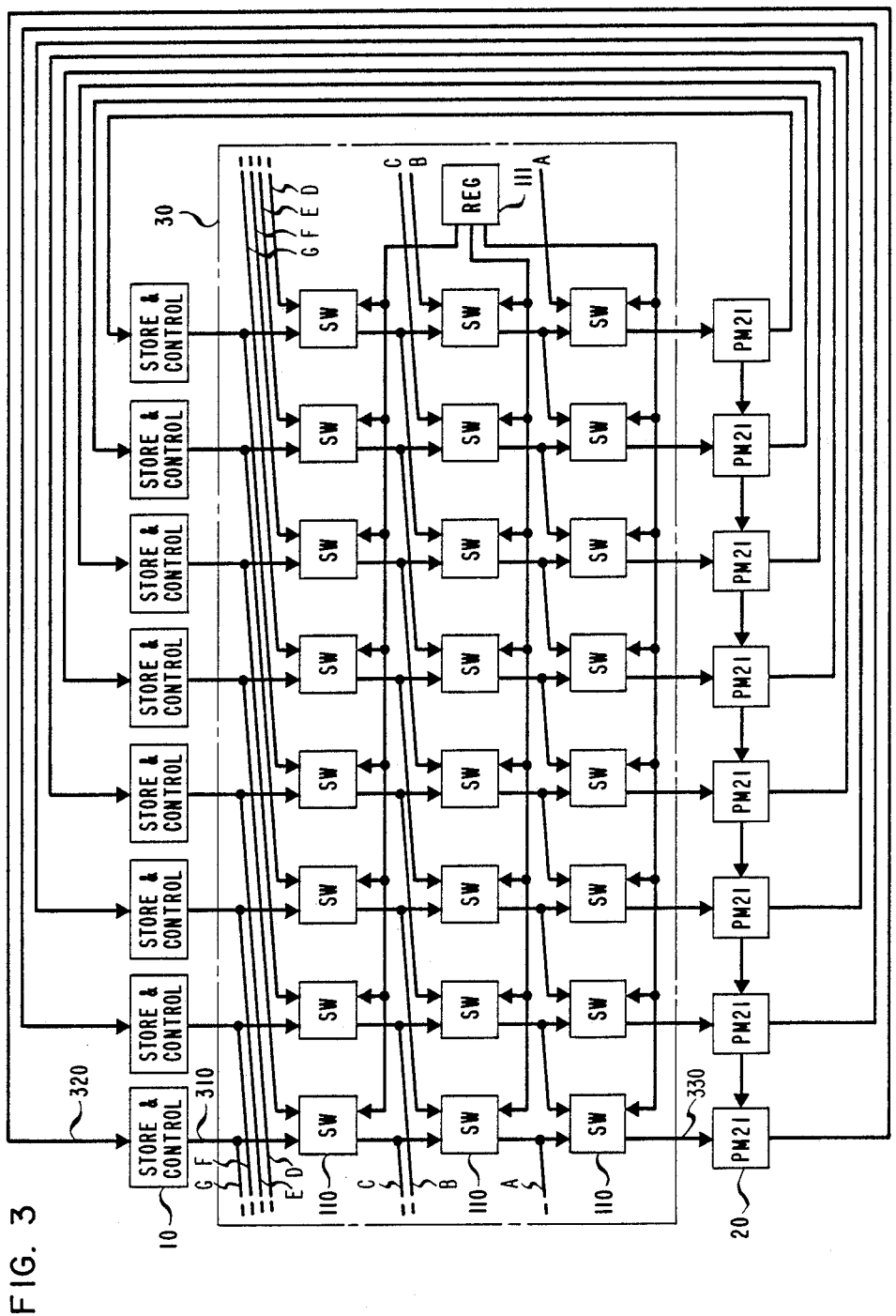
FIGS. 3 and 4 illustrate two additional embodiments of my memory circuit.

FIG. 3 depicts a straightforward realization of a memory that employs a plurality of memory networks 10 and memory access networks 20. For illustrative purposes, FIG. 3 includes eight memory networks 10 and eight memory access networks 20, and depicts the sets of lines 31 by cables 310 and the sets of lines 32 by cables 320. The realization of the FIG. 3 circuit is based on the approach of connecting the left J through Q leads of one module to the right J through Q leads of the left adjacent module. The resultant PM2I network, alas, is not "deep" enough. The number of rows, or levels, of switches 106 in the resultant network is $\log_2 N$, while the total memory size is mN, where m is the number of modules (8, in FIG. 3). Network 30 provides the additional switching levels and, accordingly, cables 310 from memory networks 10 are applied to a PM2I shift network 30, from which output cables 310 are applied to memory access networks 20. Cables 320 emanate from networks 20 and terminate, as in FIG. 2, in network 10.

Network 30 implements the shifting of the pointer designation from a memory network 10 that contains the pointer to a nonadjacent memory network 10 (if necessary). It performs its operation in a manner identical to that of the PM2I network within each memory access network 20; with the only difference being that the switches in network 30 (switches 110) are responsive to the higher order bits of the relative displacement address, stored in register 11, and comprise an N plurality of single pole double throw switches. Network 30 has a "wrap-around" construction, with leads A through G on the left side being connected to leads A through G on the right side. To summarize the shifting control in the FIG. 3 circuit, when there are m modules and N memory cells in each module, the maximum shift is in N, which may be defined by a word having $\log_2 m + \log_2 N$ bits. The $\log_2 N$ least significant bits correspond to the shifting performed in network 20 within each module (having $\log_2 N$ levels) and the $\log_2 m$ most significant bits correspond to the shifting performed in network 30 (having $\log_2 m$ levels).

As in the disclosed embodiment of network 20, variations are possible in network 30 without departing from the principles of my invention. Indeed, network 30 and the entire interconnection approach of the FIG. 3 circuit experience substantial drawbacks when the number of cells in each network 10 is large. It is simply a question of numbers: how many leads can a chip have and still be usefully interconnected to another chip? The circuit of FIG. 4 removes that difficulty by allowing each module to operate independently in modulo N, thus permitting leads J through Q of each network 20 (also designated 43 in FIG. 4) to remain within the chip. The circuit of FIG. 4 also removes the need for the external connection of N input lines 330 and N output lines 310 to each module. In FIG. 3 a moduleconsists of 10, 20 and lines 320, which correspond to lines 32 in FIG. 2; lines 310 and 330 correspond to lines 31 broken to allow the insertion of 30 in FIG. 3.

Figure 4:
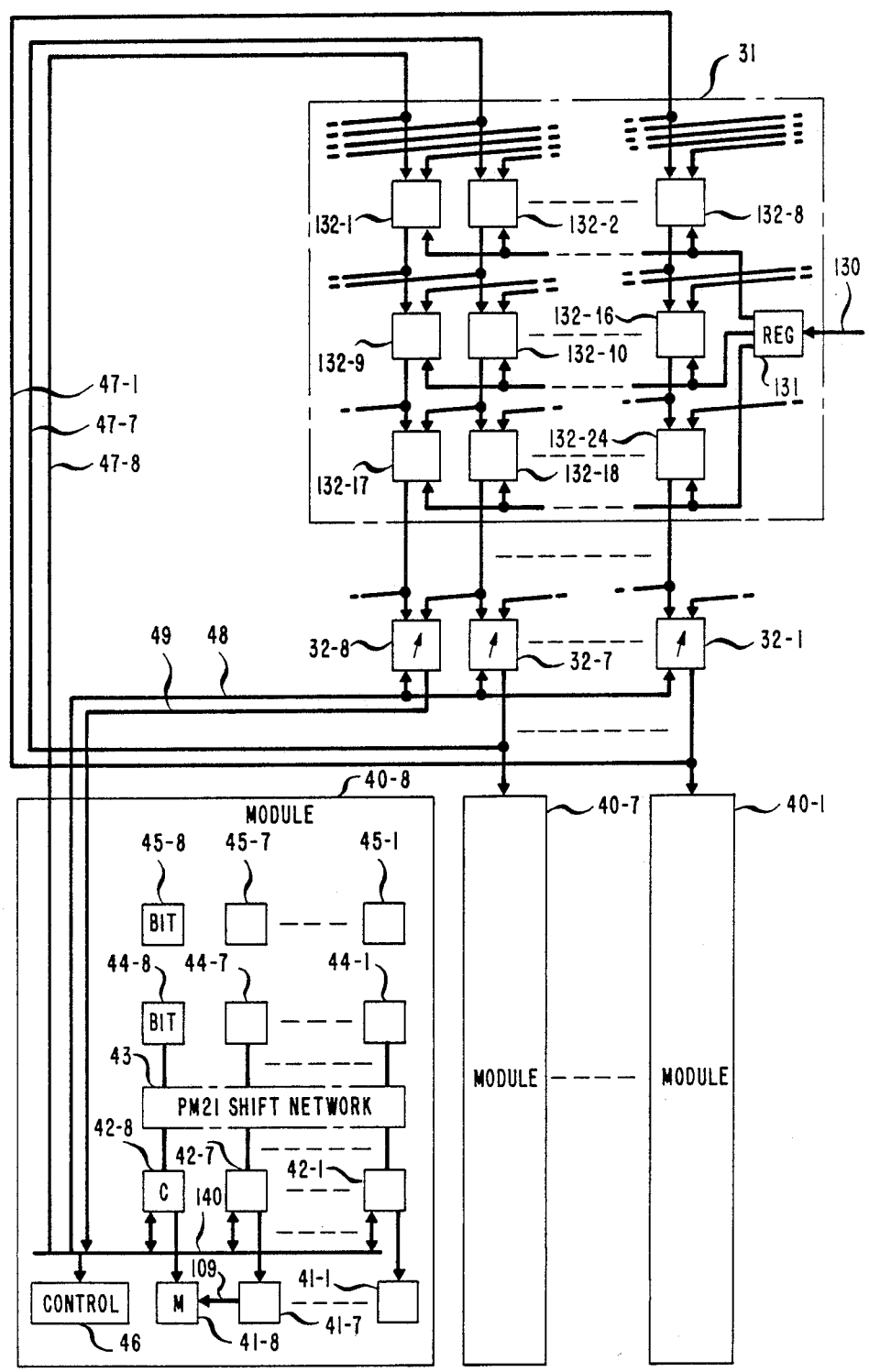

In FIG. 4, each module 40 contains both the memory network and the PM2I shift network of FIG. 2. More specifically in FIG. 4, the memory cells of FIG. 1 are depicted in a functional manner with a plurality of storage elements drawn as blocks 41 connected to control blocks 42. Blocks 42 include the control elements of FIG. 1 as well as additional control circuitry described below. The occupancy bits of FIG. 1 are represented by blocks 45 which, for the sake of clarity, are illustrated without their interconnections to the control blocks.

In addition to the FIG. 1 memory cells (a cell being the collection, for example, of blocks 45-7, 42-7, and 41-7), module 40 includes PM2I shift network 43 (identical in structure to network 20) which is responsive to a set of shadow bits illustrated by blocks 44. Blocks 44, like blocks 45, are connected to control block 42 but, again for the sake of clarity, these connections are not shown in FIG. 4. The wrap-around connections of the J through Q leads within each module (to permit modulo N shifting) are also not shown. Finally, control blocks 42 interact with a bus 140, including lines 47, 48, and 49, to which a common control unit 46 is connected.

Before continuing with the description of the FIG. 4 circuit, it may be beneficial to more fully understand the operation of modules 40, generally, and the function of the shadow bits, in particular. This understanding may be had by following the process of populating the memory system of FIG. 4 from an empty state.

When the circuit of FIG. 4 is empty, all occupancy bits are at logic "0" and a "seeding" process must take place to initially choose a location into which to store the first entry. That location can be selected arbitrarily. In a practical implementation of the FIG. 4 circuit, an initialization circuit (not shown in FIG. 4) is included to force one occupancy bit in one of the modules to appear as a "1". When that happens, a "1" bit is forced into one of the occupancy bits of one module 40, e.g., the leftmost bit 45, and a shadow bit of "1" is placed in a corresponding position within shadow pointer bits 44 of all modules 40. This is shown by entry 1 in the table below. As more information is placed in the memory circuit, additional logic "1" bits are placed adjacent to the first logic "1" in occupancy bits 45 of the initial module 40 and more logic "1" bits are correspondingly placed in shadow pointer bits 44 of all other modules 40. This condition is shown by entry 2 in the table below. As still more information is placed in the memory circuit, the initially populated module 40 fills up and, henceforth, additional information is stored in the adjacent module 40. At that point, the shadow bit registers reset to resume "shadowing" the most recent information in the new module 40. This is shown by entries 3 and 4 in the table below. Note that the filling pattern of the shadow bits given in the table is reversible.

TABLE

| entry | | module 1 | module j | module k | module N |
|---|---|---|---|---|---|
| 1 | bits 45 | 00000000 | 10000000 | 00000000 | 00000000 |
|   | bits 44 | 10000000 | 10000000 | 10000000 | 10000000 |
| 2 | bits 45 | 00000000 | 11100000 | 00000000 | 00000000 |
|   | bits 44 | 11100000 | 11100000 | 11100000 | 11100000 |
| 3 | bits 45 | 00000000 | 11111111 | 00000000 | 00000000 |
|   | bits 44 | 11111111 | 11111111 | 11111111 | 11111111 |
| 4 | bits 45 | 00000000 | 11111111 | 10000000 | 00000000 |
|   | bits 44 | 10000000 | 10000000 | 10000000 | 10000000 |

Bits 45 determine the module that contains the reference pointer of the list, as well as the cell within the module in which the reference pointer is located. The shadow bits broadcast that latter information to all the modules because the occupancy bit pattern of the module with the pointer is mimicked in all the modules. Thus, each module 40 is privy to information that states whether the reference pointer is within the module, and information that identifies the memory cell in which the reference pointer is located within the module that contains it.

Returning to FIG. 4, one of lines 47 assumes a logic level "1" when the reference pointer is found in its module. Line 48 assumes a logic level "1" when an executed shift results in a wrap-around of signals within networks 43 via the internally interconnected leads J through Q. Line 49 enables blocks 42 in the module to which the relative pointer is destined. It may be pointed out that lines 48 of all the modules always assume the same state, because all of the modules mimic the occupancy bits in the module containing the reference pointer. Accordingly, in FIG. 4, line 48 of one module (40-8) is used and the others are not. Lines 47 of the different modules 40 are connected to corresponding input ports of network 31. Network 31, like network 30, is a PM2I shift network with $\log_2 m$ levels. Its input is a sequence of bits having a single "1" in the position corresponding to the module that contains the reference pointer. The shift control input to network 31, line 130, applies a binary word to register 131 within network 31 and that binary word corresponds to the $\log_2 m$ most significant bits of the required shift. Switches 132 within network 31 are identical to switches 106 in network 20 (FIG. 2). Each output port of network 31 is connected to one input of an enable switch 32 and to a second input of the left adjacent enable switch 32. Switches 32 are identical to switches 132, effecting a shift to the left of one position when a control signal requires it. The control signal for switches 32 is applied by line 48, and the output signal of each switch 32 is applied to its associated module 40 via line 49.

The output of network 31 shifts the reference pointer from the module that contains it to become the relative pointer at the module that is destined to receive it, as required by the m most significant digits of the shift control binary word. When a wrap-around condition occurs in networks 43, the pointer is shifted not to the module indicated by the output of network 31, but to the next left module. This is achieved by means of enable switches 32.

The operation of the FIG. 4 circuit, as well as the function and structure of enable switches 32, can best be understood by the following examples where, in accord with the drawings of FIGS. 3 and 4, it is assumed that there are eight modules and each module has eight memory cells. It is further assumed that the pointer is initially found in the seventh module (module 40-7 in FIG. 4) and in the fifth cell within that module.

EXAMPLE 1

In this example it is assumed that the required shift is 3, or 000011. This is the simplest case. Since module 40-7 contains the pointer, its line 47 is at logic level "1", and all other lines 47 are at logic level "0". The input to network 31, therefore, is 01000000 and the shift control to network 31 (register 131) is 000. Concurrently therewith, within module 40-7 and within all other modules shift network 42 executes a shift to the left of 3, yielding a "local" relative pointer applied to the eighth control element 42-8 of all modules. Since the eighth control element is to the left of the fifth occupancy bit (the initial location of the pointer) no wrap-around is detected, lines 48 are at logic "0", and enable switches 32 do not perform a switch to the left. The 01000000 output of network 31 appears at the output of switches 32, enabling thereby module 40-7 and disabling all other modules 40. As module 40-7 is enabled, the "local" relative pointer applied to the eighth control element 42-8 (within 40-7) becomes the relative pointer location for the whole memory.

EXAMPLE 2

In this example it is assumed that the required shift is 10, or 001010. Again, line 47-7 of module 40-7 is at logic level "1" and the input to network 31 is 01000000. The shift control to network 31 is 001 (corresponding to the three most significant digits of the required shift), yielding a 10000000 shifted output applied to enable switches 32. Concurrently, within module 40-8, as within all other modules, shift network 42 executes a shift to the left of 2 (the 010 least significant bits of the shift control word). Again there is no wrap-around, lines 48 are at logic level "0" and enable switches 32 do not perform a shift to the left. The 10000000 output of network 31 appears at the outputs of switches 32 thereby enabling module 40-8 and disabling all other modules 40. In this example, the pointer shifts from cell 5 of module 40-7 to cell 7 of module 40-8.

EXAMPLE 3

In this example it is assumed that the required shift is 15, or 001111. As before, line 47 of module 40-7 is at logic level "1" and the input to network 31 is 01000000. The shift control to network 31 is again 001, yielding a 10000000 shifted output applied to enable switches 32. This time, however, the executed left shift within the modules is 7, corresponding to the three least significant digits of the shift control word, and that results in a wrap-around. The wrap-around results from the operation 5+7 modulo 8, which directs the pointer to the fourth control block 42 (12 modulo 8=4). A "wrap-around" condition can be detected when the "local" relative pointer gets routed to a location where the shadow occupancy bits are zero, as they are only to the right of the reference pointer locator. Since only the fifth and higher shadow occupancy bits are 1, a wrap-around condition is detected and all lines 48 rise to logic level "1". In response to the logic 1 on line 48, enable switches 32 shift to the left. Because of the wrap-around construction of the FIG. 4 circuit, the 1000000 output of network 31 yields the pattern 00000001 at the output of enable switches 32 and, accordingly, module 40-1 is enabled.

CONTROLS

Each control circuit 3-i in FIG. 1 controls the $i^{th}$ occupancy bit and the $i^{th}$ storage element. This control is subject to a "mode" and "operation" specification. That is, the control is dependent on whether the mode specifies that the pointer sought is to the right of the list sequence (P1=1) or to the left of the list sequence (P1=0), and whether the operation specifies execution of a "read" (P2=1) or a "write" (P2=0) operation.

A simple combinatorial detector circuit (basically, a number of AND, ER, and INVENTER gates) within each control element develops the necessary control signals in accordance with the table below:

| System Condition | Input to Detect | Action |
|---|---|---|
| left pointer (P1=0), write (P2=0) | 001 | write, set bit |
| left pointer (P1=0), read (P2=1) | 011 | read, reset bit |
| right pointer (P1=1), write (P2=0) | 100 | write, set bit |
| right pointer (P1=1), read (P2=1) | 110 | read, reset bit |

Figure 5:
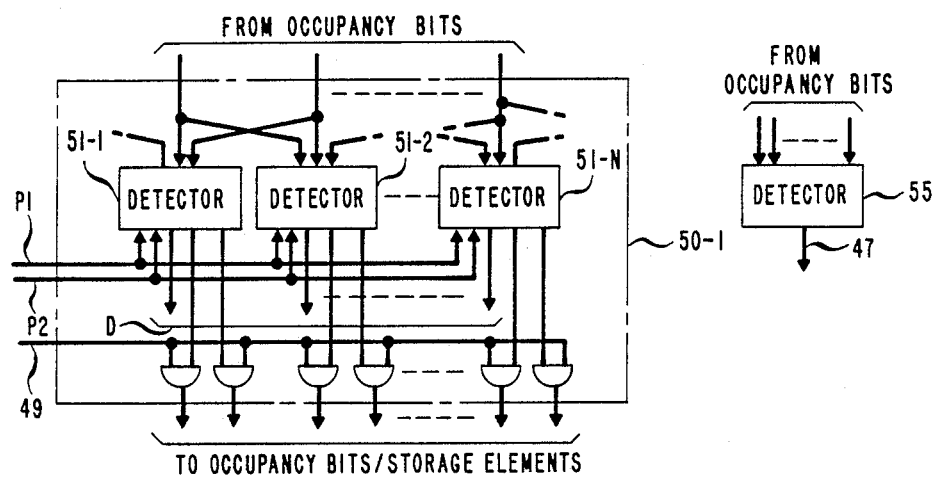
FIG. 5 depicts the control circuits employed in the memory circuit of FIG. 4.
Figure 5:
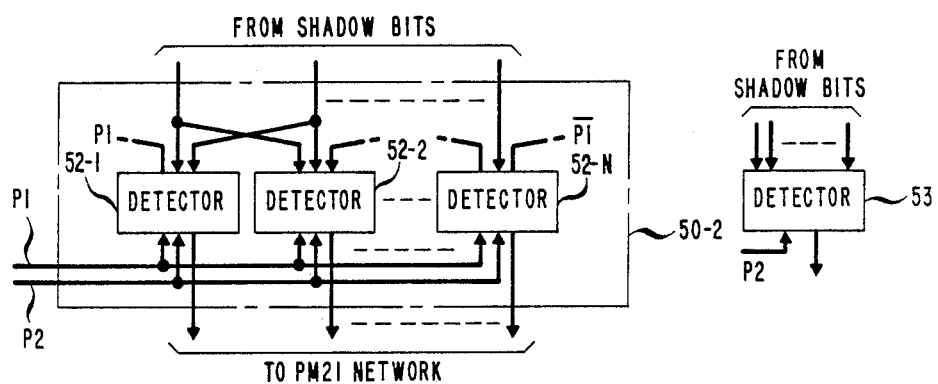
Figure 5:
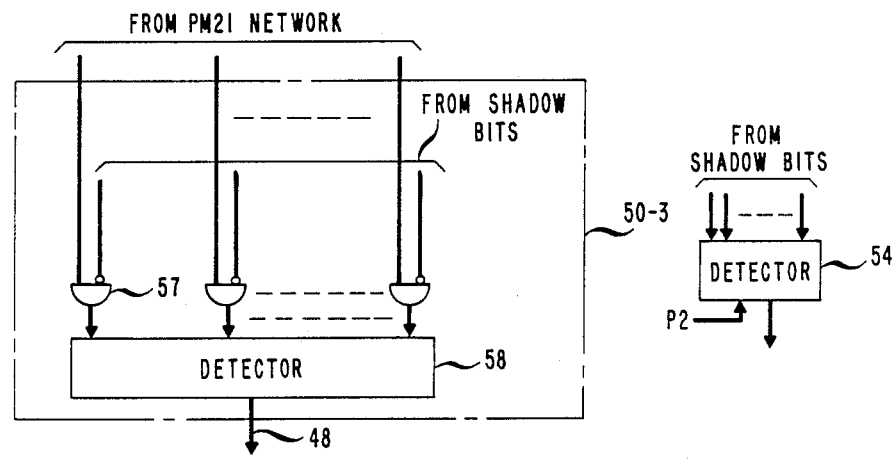

FIG. 5 depicts the major components of the FIG. 4 control circuits, including subcircuits 50-1 and 50-2 which represent control blocks 42. In subcircuit 50-1 each detector 51 corresponds to an occupancy bit detector of a control module 42, implementing the detection specified by the above table; and likewise, in subcircuit 50-2 each detector 52 corresponds to a shadow bit detector of a control module 42. Subcircuit 50-2 differs from subcircuit 50-1 in that the first and last detectors 51 receive input from adjacent modules, whereas the first and last detectors 52 receive input from the P1 control signal instead. This difference results from the independent operation of the shadow bits, as generally described above and more explicitly discussed below.

Revisiting the operation of the shadow bit, when a new data input is presented to the memory system of FIG. 4, it is stored in the storage element that is adjacent to the most recently stored data, and the occupancy bit associated with that storage element is set. All other occupancy bits in the memory system are left unchanged. The shadow bit associated with the set occupancy bit is also set and so are the shadow bits in each and every module that correspond to the set shadow bit in the module that stored the data. By way of example, when data is stored in storage element 7 of module 3, occupancy bit 7 of module 3 is set and so are shadow bits 7 of all the modules.

In accordance with the above, when a module is full and a write command appears, a "1" is placed in the first occupancy bit of the adjacent module. The new occupancy bit pattern, in the module with the most recently stored information, is 10000000 and the shadow bit pattern of all the modules must follow suit. Accordingly, the shadow bits of all the modules must change state from 11111111 to 1000000. Conversely, when a module is emptied with a read command, the shadow bits of all the modules must change state from 1000000 to 11111111.

Detection of the need to set and reset the shadow bits in accordance with the above is implemented in FIG. 5 with common control detectors 53 and 54. Circuit 53 detects the condition P2=0 with a shadow bit pattern 11111111, and circuit 54 detects the condition P2=1 with a shadow bit pattern 1000000. Another common control circuit in FIG. 5 detects the presence of the pointer on the module. It is responsive to the presence of a "1" at the output of detectors 51 and comprises an OR gate 55 for developing a signal on output line 49. The last common control circuit develops a signal representative of the wrap-around condition within PM2I network 42. As discussed above, this condition may be detected by the appearance of a "1" at the output of PM2I network 42 that is to the right of the "1" at the input of PM2I network 42. This detection is implemented in subcircuit 50-3, with the aid of OR gates 56, AND gates 57, and AND gate 58 developing an output signal on line 48.

The above description and drawings are merely illustrative of the principles of my invention and variations, such as inclusion of the ability to delete and/or insert within the list, are clearly within the scope of my invention. With respect to these two abilities, for example, the only modification that would be necessary is the addition of simple circuitry to the common control that would detect the command to delete, would delete the desired data entry, and would shift one position to the left (via lines 109, as shown in FIG. 2) the data stored to the right of the deleted data entry. The reverse process would apply to the insertion of a data entry within the list; to wit, shift the entries to the left of the position where the data is to be inserted and insert the data entry into the resultant empty storage element.

Figure 6:
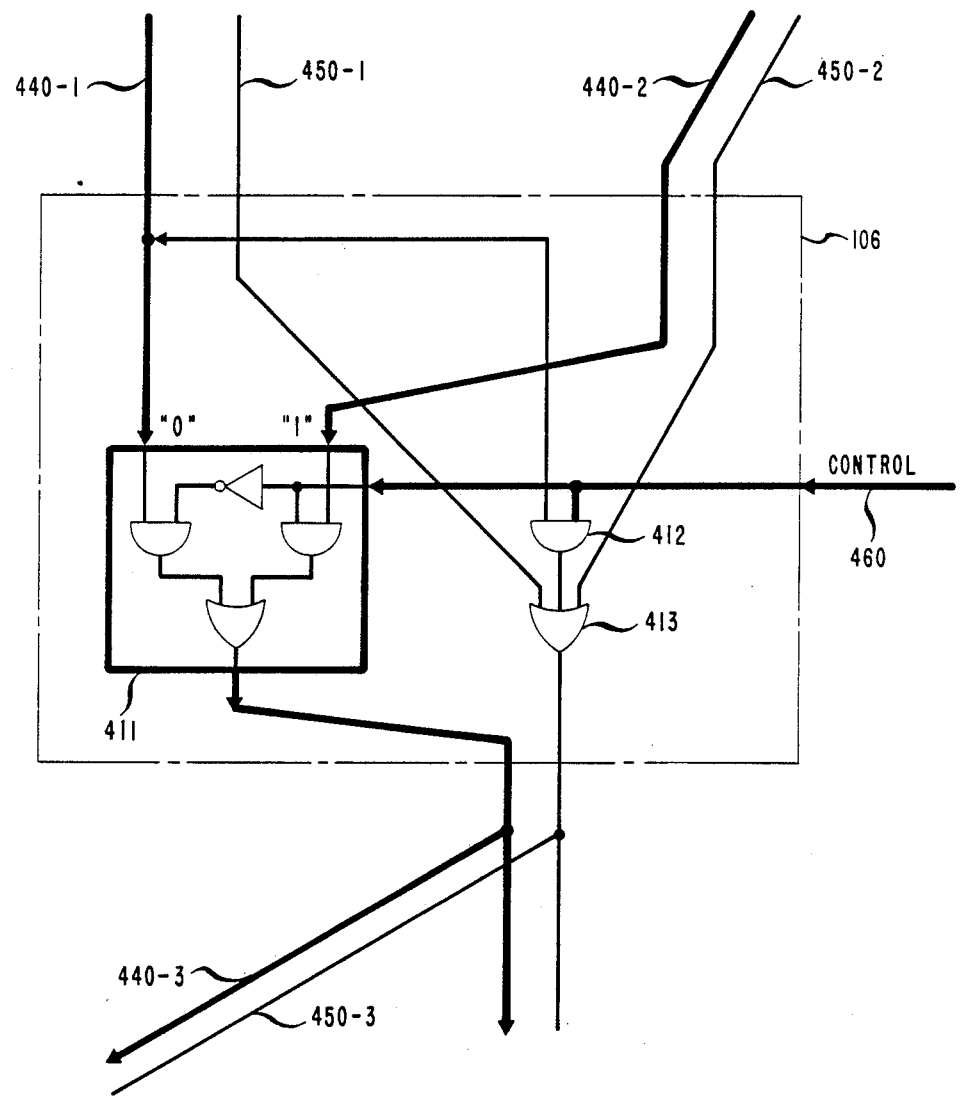
FIG. 6 presents a diagram of element 100 of FIG. 2.

To permit efficient simultaneous control of the shift operation when more than one memory module is employed (in contradistinction, for example, to ripple through control) each module must develop its own shift control signals. Such distributed shifting control is achieved with a "shift flag" that is "1" at every location between the reference pointer and the relative pointer. This flag differentiates between the occupied memory locations to the left and right of the relative pointer. It is simply derived by considering each link in the PM2I networks, i.e., each input and output of the single pole double through switches as consisting of two lines—one for the pointer routing as already described, and one for the shift flag. The bold lines illustrate the circuitry for routing the relative pointer, the light ones illustrate the generation and routing of the shift flag. The simple circuit in FIG. 6 implements elements 32, 132 of FIG. 4 and element 106 of FIG. 2. A straightforward control circuit using such a shift flag, in conjunction with control signals already described, can generate shift signals for each memory cell in a distributed manner. With this circuit, the reference pointer, but not the relative pointer is flagged.

It should be noted that the hierarchical architecture illustrated in FIG. 4 can be extended to 3 (or more) levels with additional modules similar to 31. In such cases the most significant block of bits would switch the highest level 31-type network, and would enable 31-type networks switched by the next most significant block, and so on.

What is claimed is:

1. A memory apparatus including memory cells for storing data entries in adjacent ones of said memory cells comprising:

an occupancy bit associated with each of said cells for developing a memory cell pointer based on the occupancy pattern of said memory cells to identify an end occupied cell having an unoccupied cell adjacent thereto;

a pointer shifting network for displacing said pointer by a number, in the range 1 to N, where N is greater than 1, in response to an applied displacement value, for pointing to an occupied cell that is removed from said end occupied cell by said applied value; and means for accessing said occupied cell.

2. The memory apparatus of claim 1 wherein said memory cells include means for simultaneously shifting data entries on one side of said displaced pointer to adjacent memory cells.

3. A memory apparatus in accordance with claim 1 wherein said pointer is multidigit word and said means for displacing said pointer is a plus-minus 2i shift network executing a shift in accordance with said applied displacement value.

4. A memory apparatus comprising a memory means for storing a data list in a contiguous set of memory cells, forming a block having a cell at each of two ends; and memory access means responsive to an applied displacement address signal of a selected alterable integer value including (a) first means for generating a reference pointer signal pointing to one of said ends, (b) second means for altering said pointer in accordance with said applied displacement address signal, and for thereby pointing to a cell within said block that is removed from the end pointed to by said first means by said applied displacement address signal, and third means for accessing a cell in said memory displaced from said reference pointer by a number of cells as determined by said displacement address signal.

5. The memory apparatus of claim 4 wherein said memory access means further includes means responsive to a mode signal indicating different modes of operation, for performing the operation specified by said mode signal at said data entry location accessed by said memory access means.

6. The memory apparatus of claim 4 wherein said memory access means further includes means for generating a carry signal when the displacement introduced by said displacement address exceeds the number of locations between said reference pointer and the end of said memory in the direction of said displacement.

7. A memory system including a plurality of memory elements for storing information applied to a signal bus of said memory system in an ordered fashion within said memory elements to form a list of stored information that preserves the order in which said information is stored and permits the reading of said stored information by applying said stored information to said signal bus, said writing and reading occurring in accordance with individualized control signals applied to each of said memory elements comprising:

an occupancy bit associated with each of said memory elements for indicating whether the associated memory element is occupied with stored information;

a plurality of control elements, each associated with one of said memory elements and occupancy bits, responsive to its associated occupancy bit, to two other occupancy bits and to a mode control signal specifying a sought characteristic, for developing an output signal indicative of whether the associated memory element possesses said sought characteristic, with the collection of said output signals comprising a pointer signal; and a pointer shifting network, responsive to a displacement address and to said pointer signal, for developing a shifted pointer signal applied to said plurality of control elements to develop said individualized control signals.

8. A memory system comprising:

a plurality of information storing memory modules, each responsive to a mode control signal, to a first portion of a displacement address and to an enable signal and developing a pointer signal indicative of the existence in said module of a stored information condition defined by said mode signal; and switching means responsive to said pointer signals and to a second portion of said displacement address for developing said enable signal for each of said memory modules each of said memory modules further comprises means for developing an occupancy signal indicative of whether said memory module is at a condition of being empty, fully populated with stored information, or partially populated with stored information;

means for developing a shadow signal that mimics the occupancy signal of that one of said memory modules whose occupancy signal indicates that the memory module is at a condition of being partially populated with stored information;

control means responsive to said occupancy signal for developing said pointer signal; and shift means responsive to said second portion of the displacement address for shifting said shadow signal and applying its shifted output signal to said control means.

* * * * *